US010514911B2

(12) United States Patent
Ayzenfeld et al.

(10) Patent No.: US 10,514,911 B2
(45) **Date of Patent: *Dec. 24, 2019**

(54) STRUCTURE FOR MICROPROCESSOR INCLUDING ARITHMETIC LOGIC UNITS AND AN EFFICIENCY LOGIC UNIT

(71) Applicant: International Business Machines Corporation, Armonk, NY (US)

(72) Inventors: Avraham Ayzenfeld, Ramat Hahayal (IL); Lee E. Eisen, Round Rock, TX (US); Brian W. Curran, Saugerties, NY (US); Christian Jacobi, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/554,194

(22) Filed: Nov. 26, 2014

(65) Prior Publication Data

US 2016/0147530 A1 May 26, 2016

(51) Int. Cl.
*G06F 9/30* (2018.01)
*G06F 9/38* (2018.01)
*G06F 17/50* (2006.01)

(52) U.S. Cl.
CPC ........ *G06F 9/3001* (2013.01); *G06F 9/30141* (2013.01); *G06F 9/3824* (2013.01);
(Continued)

(58) Field of Classification Search
CPC .... G06F 9/3001; G06F 17/50; G06F 9/30141; G06F 9/3824; G06F 9/3836; G06F 9/30021; G06F 9/30094
See application file for complete search history.

(56) References Cited

U.S. PATENT DOCUMENTS 3,728,531 A 4/1973 Young, Jr.
4,888,722 A * 12/1989 Boreland ................ G06F 7/575 708/525

(Continued)

FOREIGN PATENT DOCUMENTS

CN 102662629 A 9/2012
EP 0380099 A2 * 8/1990 ........... G06F 7/5095

(Continued)

OTHER PUBLICATIONS

Wu, Gin-Der, and Kuei-Ting Kuo. "Dual-ALU Structure Processor for Speech Recognition." IEEE Xplore. IEEE, Apr. 2006. Web. Sep. 15, 2016.*

(Continued)

*Primary Examiner* — Aimee Li
*Assistant Examiner* — Andrew J Cromer

(57) ABSTRACT

Examples of techniques for designing processors are described herein. In one example, a design structure can be tangibly embodied in a machine readable medium for designing, manufacturing, or testing an integrated circuit. The design structure can include a logic to determine whether a received instruction is an updating fixed point instruction or a non-updating fixed point instruction. The design structure can include a first arithmetic logic unit (ALU) to execute the received instruction if the received instruction is determined to be an updating fixed point instruction and store an update value in a general register. The design structure can include a second arithmetic logic unit (ALU) to execute the received instruction if the received instruction is determined to be a non-updating fixed point instruction.

7 Claims, 5 Drawing Sheets

216 Efficiency Logic
202 Update ALU
204 Efficiency ALU
212
214
206
Data General Register
Result General Register
Data General Register
Data General Register
Data General Register
210 208 210 210
200

(52) U.S. Cl.
CPC ........ *G06F 9/3836* (2013.01); *G06F 17/5045* (2013.01); *G06F 2217/68* (2013.01)

(56) References Cited

U.S. PATENT DOCUMENTS 4,954,947 A * 9/1990 Kuriyama ............. G06F 9/3824 712/218
5,537,606 A * 7/1996 Byrne ................. G06F 9/30109 711/169
5,644,780 A * 7/1997 Luick .................... G06F 9/3012 711/127
5,761,475 A 6/1998 Yung et al.
5,784,634 A * 7/1998 Worrell ................. G06F 9/3867 712/1
6,263,416 B1 7/2001 Cherabuddi
6,289,435 B1 9/2001 Lange et al.
8,234,489 B2 7/2012 Williamson et al.
8,250,337 B2 * 8/2012 Shih ...................... G06F 9/3001 712/11
9,152,427 B2 * 10/2015 Vorbach .................. G06F 8/443
2005/0198472 A1 * 9/2005 Sih ...................... G06F 9/30014 712/218
2005/0278510 A1 12/2005 Jacobs et al.
2010/0180129 A1 * 7/2010 Smith ................. G06F 9/30145 713/190
2012/0124586 A1 * 5/2012 Hopper ............... G06F 9/30145 718/102
2012/0216012 A1 * 8/2012 Vorbach .................. G06F 8/443 712/11
2013/0003870 A1 * 1/2013 Swan ................... H04N 19/436 375/240.26
2013/0097408 A1 * 4/2013 Seal .................... G06F 9/30021 712/208
2013/0311532 A1 * 11/2013 Olsen .................. G06F 9/30025 708/491
2013/0339689 A1 12/2013 Srinivasan et al.
2015/0227367 A1 * 8/2015 Eyole-Monono ........................... G06F 9/30036 712/7

FOREIGN PATENT DOCUMENTS

EP 0954791 A1 * 11/1999 ........... G06F 9/3001
EP 2600242 A1 6/2013
EP 2624126 A1 8/2013

OTHER PUBLICATIONS

Patterson, David A., and John L. Hennessy, "Computer Organization and Design: The Hardware/Software Interface", Morgan Kaufmann, n.d. Print., 5th Edition, Pertinent pp. (82-83, 253-255, and 365-366) (Year: 2013).*

Hayden So, "Introduction to Fixed Point Number Representation", Spring 2006, https://web.archive.org/web/20060913212304/http:/www-inst.eecs.berkeley.edu/~cs61c/sp06/handout/fixedpt.html, Pertinent pp. (1-5) (Year: 2006).*

Nam Sung Kim et al., "Reducing Register Ports Using Delayed Write-Back Queues and Operand Pre-Fetch," ICS '03 Proceedings of the 17th Annual International Conference on Supercomputing, pp. 172-182, 2003.

Il Park et al., "Reducing Register Ports for Higher Speed and Lower Energy," Microarchitecture, 2002 (MICRO-35), Proceedings 35th Annual IEEE/ACM International Symposium, pp. 171-182, 2002.

* cited by examiner

300

500

STRUCTURE FOR MICROPROCESSOR INCLUDING ARITHMETIC LOGIC UNITS AND AN EFFICIENCY LOGIC UNIT

BACKGROUND

The present techniques relate to a microprocessor design structure, and more specifically, to a design structure for a microprocessor including specialized arithmetic logic units to perform fixed point instructions.

SUMMARY

According to an embodiment described herein, a design structure tangibly embodied in a machine readable medium for designing, manufacturing, or testing an integrated circuit, the design structure can include a logic to determine whether a received instruction is an updating fixed point instruction or a non-updating fixed point instruction. The design structure also can include a first arithmetic logic unit (ALU) to execute the received instruction if the received instruction is determined to be an updating fixed point instruction. The first ALU can also store an update value in a general register. The design structure also can include a second arithmetic logic unit (ALU) to execute the received instruction if the received instruction is determined to be a non-updating fixed point instruction.

According to another embodiment described herein, a method in a computer-aided design system for generating a functional design model of a processor can include generating a functional representation of logic to determine whether an instruction is an updating instruction or a non-updating instruction. The method also can include generating a functional representation of a first arithmetic logic unit (ALU) coupled to a general register in the processor, the first ALU to execute the instruction if the instruction is an updating instruction and store an update value in the general register. The method further can include generating a functional representation of a second ALU in the processor to execute the instruction if the instruction is a non-updating instruction.

According to another embodiment described herein, a processor can include a plurality of general registers. The processor can also include a first arithmetic logic unit (ALU) to perform a fixed point instruction using at least two general registers and store a result in at least a third general register. The processor can further include a second ALU to perform a fixed point instruction using at least two general registers. The processor can also further include logic to send an instruction to the first ALU if the instruction is an updating instruction or to the second ALU if the instruction is a non-updating instruction.

DETAILED DESCRIPTION

Figure 1:
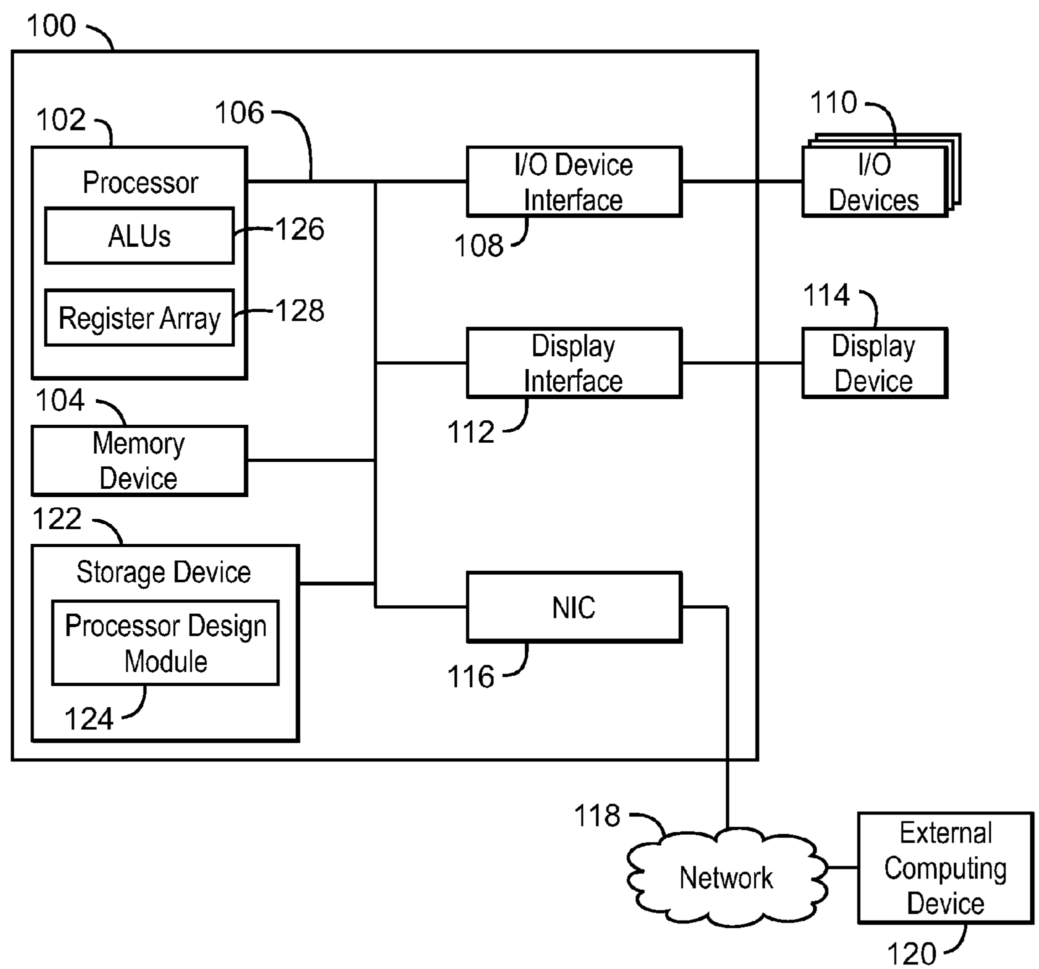
FIG. 1 is block diagram of an example computing device that can process fixed point instructions based on number of registers.

Typically, a microprocessor has at least one arithmetic logic unit (ALU). An ALU may have several functions such as updating a general register for arithmetic instructions, calculating branch addresses for branch instructions, moving miscellaneous values such as configuration register values to a general register and/or generating condition code for relevant micro-operations. A traditional fixed point arithmetic logic unit may use two data general registers and one result general register. Accordingly, a microprocessor that includes a traditional fixed point arithmetic logic unit may have two read ports and one write port to general registers. Additionally, in some examples, microprocessors can include multiple fixed point arithmetic logic units to achieve a higher instructions per cycle (IPC) count. These microprocessors also typically have out of order implementations that include use of a register array for storing renamed values of general register results. The register arrays can accommodate a limited amount of read and write ports, and each port added may reduce the frequency at which a register array can operate.

According to embodiments of the present disclosure, a microprocessor can be designed to process instructions based on a whether the instruction is an updating or a non-updating instruction. An instruction, as used herein, includes any micro-operation or uop that can be executed internally on a microprocessor. Different kinds of instructions may be sent to specialized arithmetic logic units (ALUs) based on whether the specific instruction is to use write ports. For example, non-updating instructions may read a plurality of registers without using any write ports during execution. Updating instructions may read a plurality of registers and also write results to one or more registers during execution. Therefore, an updating instruction requires more registers as it needs to access registers for writing the results, and not only for reading the operands. Accordingly, a non-updating instruction, as used herein, refers to an instruction that does not update or write a result to a general register during execution. An updating instruction, as used herein, refers to an instruction that stores an update value or writes a result to a general register during execution. In some embodiments, non-updating instructions can be executed on one kind of ALU while updating instructions are simultaneously executed on another type of ALU. By splitting instructions between two types of ALUs, the total number of ports in a processor can be reduced as non-updating instructions do not use write ports. Thus, the instructions can be processed more efficiently by using fewer array ports. The implementations described herein also allow for the use of more execution units. An execution unit refers to a portion of a CPU that may contain its own internal control sequence unit, registers and ALUs. As a processor may have multiple parallel execution units, the use of fewer ports by each execution unit may allow more execution units to be utilized at a given frequency.

With reference now to FIG. 1, an example computing device can process fixed point instructions based on the number of registers each instruction uses. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver.

The processor 102 may also be linked through the system interconnect 106 to a storage device 122 that can include a hard drive, an optical drive, a USB flash drive, an array of drives, or any combinations thereof. In some examples, the storage device may include a processor design module 124. The processor design module 124 may contain a one or more design structures for producing processors in accordance with the techniques described herein. A design structure, as used herein, may be a logical simulation design structure that is a logically equivalent functional representation of a hardware device or comprise data and/or program instructions that can be used to generate a functional representation of the physical structure of a hardware device, as discussed in greater detail in FIG. 5. For example, processor design module 124 may perform the method 300 described in detail below.

The processor 102 may also include a plurality of ALUs 126 and a register array 128. For example, the processor 102 may include one or more update ALUs and one or more efficiency ALUs as described in FIG. 2 below. The ALUs 126 may receive instructions to perform operations such as integer arithmetic operations and logical operations, among others, as described in greater detail below with reference to FIG. 2. The execution of the instructions may include reading and/or writing to the register array 128. In some examples, any update to register array 128 may be replicated to all ALUs 126.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). For example, due to physical capabilities such as the number of ports that can be implemented in a single physical array, there may be several register arrays 128. Furthermore, any of the functionalities of the processor design module 124 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the processor design module 124 can be implemented with logic, wherein the logic, as referred to herein, can include any suitable hardware (e.g., a processor, among others), software (e.g., an application, among others), firmware, or any suitable combination of hardware, software, and firmware.

Figure 2:
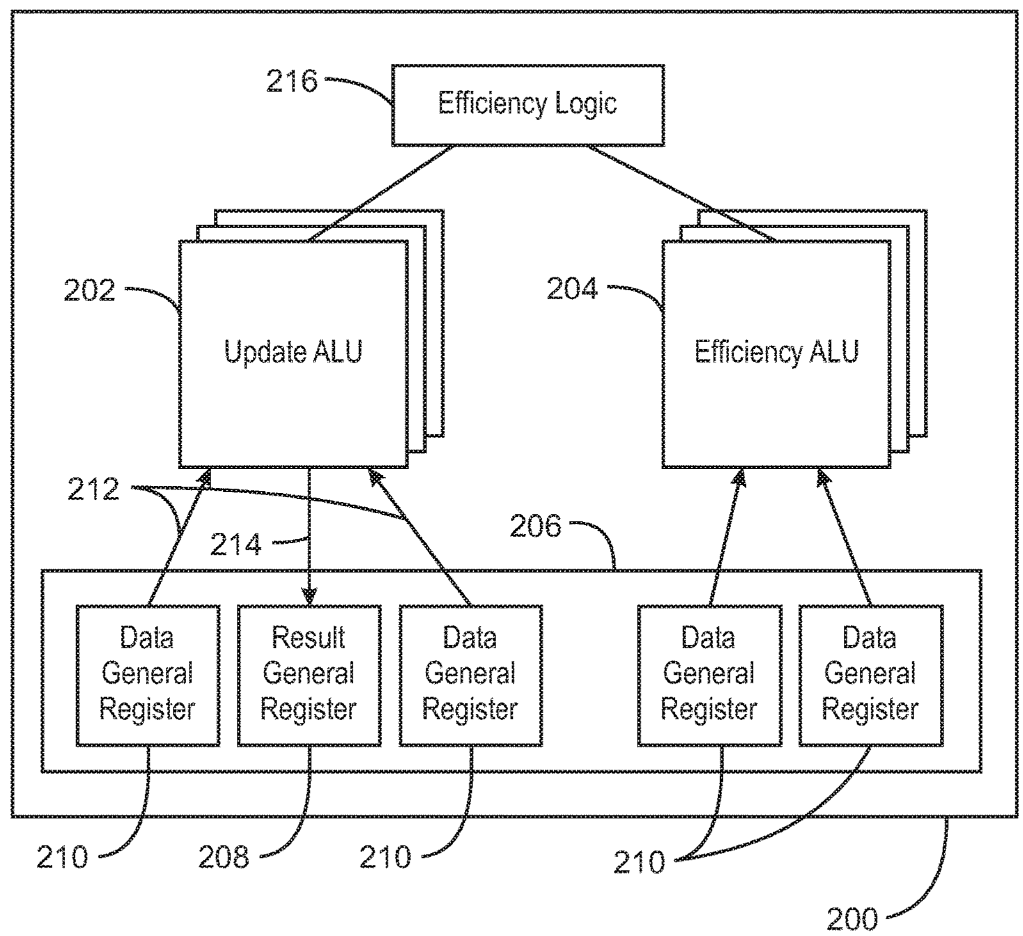
FIG. 2 is a block diagram of a processor that can process fixed point instructions based on a number of registers used by a fixed point instruction.

FIG. 2 is a block diagram of an example processor that can process fixed point instructions based on a number of registers used by a fixed point instruction. In some embodiments, the processor 200 can include one or more update arithmetic logic units (ALU) 202, one or more efficiency ALUs 204, and a registry array 206 with at least one result general register 208 and a plurality of data general registers 210. The update ALU 202 may be operatively coupled to two data general registers 210 via two read ports 212, and a result general register 208 via a write port 214. In some examples, registry array 206 may be one logical array. For example, any update to registry array 206 may be replicated to all ALUs 202, 204. In addition, registry array 206 may include multiple physical arrays due to physical capabilities mentioned above. The processor can also include an efficiency logic 216 that is coupled to both the update ALU 202 and the efficiency ALU 204.

In implementations, the update ALU 202 can communicate with the at least one data general register 210 to process instructions that include writing an update value to the result general register 208 via writing port 214. For example, the update ALU 202 can perform an updating instruction by reading the values from two data general registers 210, generating a result based on the two values, and storing the resulting update value in a result general register 208. In some embodiments, the update ALU 202 can execute an addition instruction by reading the values of two data general registers 210 and generating a sum of the two values. The update ALU 202 may send the resulting sum as an update value to the result general register 208. In some examples, an updating instruction may include other arithmetic instructions that may include storing an update value in the result general register 208.

In some embodiments, the efficiency ALU 204 may communicate with two data general registers 210 while processing a non-updating instruction. A non-updating instruction can include instructions that do not write data to a result general register 208. For example, a non-updating instruction can include instructions that generate condition codes for relevant micro-operations, among other instructions not including storing an update value in a result general register. In some examples, processing the non-updating instructions can include comparing instructions that generate internal updates of configuration registers from the general register array, moving a value of configuration registers to the general registers array. In some examples, a non-updating instruction includes comparing instructions that generate a condition code or branch addresses. In some examples, the efficiency ALU 204 may process non-updating instructions in parallel to the update ALU 202 processing updating instructions.

In some embodiments, the efficiency logic 216 can determine whether an instruction is an updating instruction or a non-updating instruction. In some examples, if the instruction is an updating instruction, the efficiency logic 216 can send the instruction to be processed by the update ALU 202. In some examples, if the instruction is a non-updating instruction, then the efficiency logic 216 can send the instruction to be processed by the efficiency ALU 204. In some examples, the efficiency logic 216 can determine the type of instruction based on the number of general registers to be used to execute the instruction. For example, the efficiency logic can analyze the number of arguments in an instruction to determine which ALU can execute the instruction. In some examples, the efficiency logic can send an instruction to an ALU by comparing the received instruction to a predetermined list or table that indicates which ALU executes each instruction.

Figure 3:
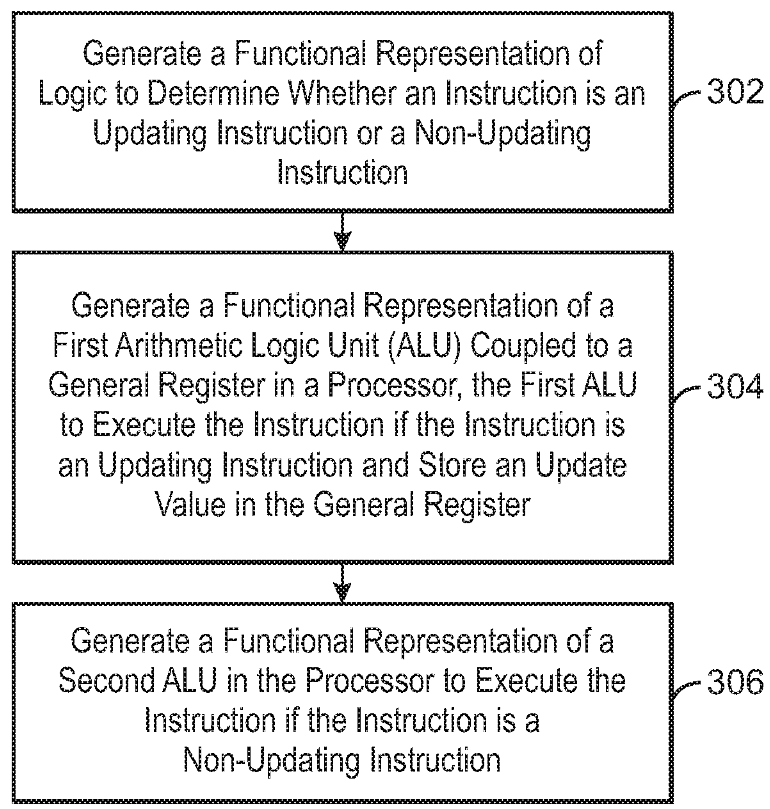
FIG. 3 is a process flow diagram of an example method that can generate a functional design model of a processor.

FIG. 3 is a process flow diagram of an example method that can generate a functional design model of a processor. The method 300 can be implemented with any suitable computing device, such as the computing device 100 of FIG. 1.

At block 302, the processor design module 124 may generate a functional representation of an efficiency logic to determine whether an instruction is an updating instruction or a non-updating instruction. For example, the instruction can be compared to a list of known operations that do not store a result. An updating instruction may include an arithmetic operation such as addition, subtraction, multiplication or division, among others. A non-updating instruction may include a compare operation or generation of a condition code, and the like.

At block 304, the processor design module 124 may generate a functional representation of a first arithmetic logic unit (ALU) coupled to a general register 208 in a processor. In some examples, the functional representation may include a first ALU to execute the instruction if the instruction is an updating instruction and store an update value in the general register 208. For example, the first ALU may perform an addition instruction and update the result general register 208 with a sum. In some embodiments, the first ALU can execute any suitable operation that stores a result in a register.

At block 306, the processor design module 124 may generate a functional representation of a second ALU in the processor to execute the instruction if the instruction is a non-updating instruction. For example, the functional representation may include a second ALU that may execute an instruction that does not store a result in a register. For example, the second ALU may perform a compare operation by subtracting one data general register 210 from another data general register 210. In some examples, the second ALU may perform an operation by an instruction that generates internal updates of configuration registers that are derived from the general register array values, moving a value of configuration registers to the general registers array. In some examples, non-updating instruction can include instructions that generate a condition code or branch addresses. The second ALU may perform a compare operation on the instruction to generate a condition code or branch address. In some examples, the functional representation may include a first ALU that may process the updating instructions in parallel with a second ALU that may process non-updating instructions.

The process flow diagram of FIG. 3 is not intended to indicate that the operations of the method 300 are to be executed in any particular order, or that all of the operations of the method 300 are to be included in every case. For example, the efficiency logic may be generated before the first ALU and/or the second ALU. Additionally, the method 300 can include any suitable number of additional operations. For example, the processor design module 124 may generate additional functional representations of ALUs.

The present techniques may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
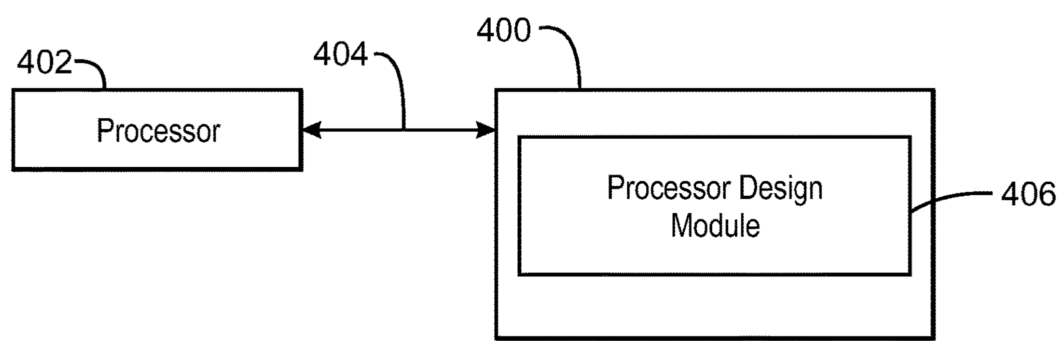
FIG. 4 is a tangible, non-transitory computer-readable medium that can embody a design structure for designing, manufacturing, or testing an integrated circuit.

Referring now to FIG. 4, a block diagram is depicted of an example of a tangible, non-transitory computer-readable medium that can embody a design structure for designing, manufacturing, or testing an integrated circuit. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a processor design module 406 may design, manufacture or test a processor 200 with update ALUs 202 and efficiency ALUs 204. In some embodiments, the processor design module 406 can be used to design a processor 200 with at least one update ALU 202 and at least one efficiency ALU 204. The processor design module 406 may also be used to manufacture the processor 200 according to the design. In some examples, the processor design module 406 may also be used to test a processor 200. For example, the processor 200 may include a first arithmetic logic unit (ALU) to perform an updating fixed point instruction and write an update value to a result general register. The processor 200 may also include a second ALU to perform a non-updating fixed point instruction. The processor 200 may also include two read ports and one write port communicatively coupled to the first arithmetic unit and two read ports communicatively coupled to the second arithmetic unit. In some examples, the first ALU and the second ALU are to perform the fixed point updating and non-updating instructions in parallel.

The processor 402 may receive instructions via instruction fetch 408. In some examples, the processor 402 may execute the instructions from the processor design module 406 with any number of ALUs 410. In some examples, the processor 402 may also read and/or write to register array 412 when executing instructions such as those provided by processor design module 406.

It is to be understood that any number of additional software components not shown in FIG. 4 may be included within the tangible, non-transitory, computer-readable medium 400, depending on the specific application.

Figure 5:
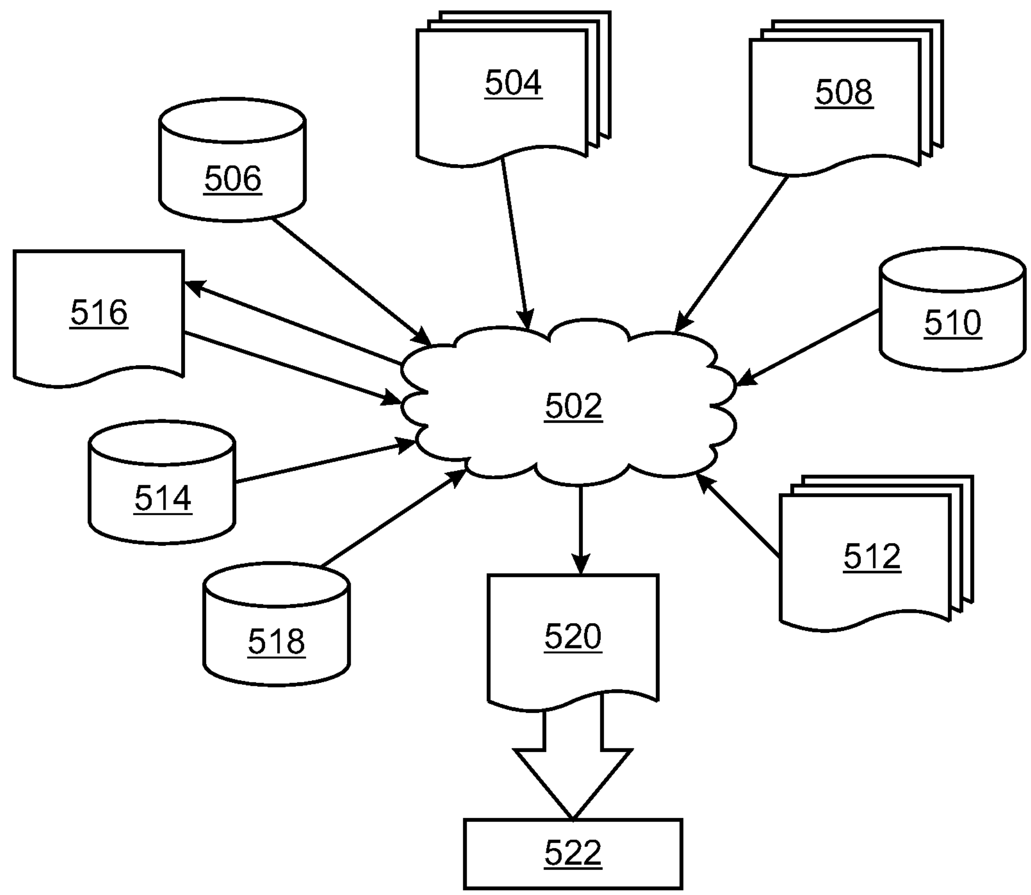
FIG. 5 is a block diagram of an exemplary design flow 500 used for example, in semiconductor IC logic design, simulation, test, layout, and manufacture.

FIG. 5 shows a block diagram of an exemplary design flow 500 used for example, in semiconductor IC logic design, simulation, test, layout, and manufacture. Design flow 500 includes processes, machines and/or mechanisms for processing design structures or devices to generate logically or otherwise functionally equivalent representations of the design structures and/or devices described above and shown in FIG. 2. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 504 that is preferably processed by a design process 502. Design structure 504 may be a logical simulation design structure generated and processed by design process 502 to produce a logically equivalent functional representation of a hardware device. Design structure 504 may also or alternatively comprise data and/or program instructions that when processed by design process 502, generate a functional representation of the physical structure of a hardware device. Whether representing functional and/or structural design features, design structure 504 may be generated using electronic computer-aided design (ECAD) such as implemented by a core developer/designer. When encoded on a machine-readable data transmission, gate array, or storage medium, design structure 504 may be accessed and processed by one or more hardware and/or software modules within design process 502 to simulate or otherwise functionally represent an electronic component, circuit, electronic or logic module, apparatus, device, or system such as those shown in FIGS. 1-2. As such, design structure 504 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 502 preferably employs and incorporates hardware and/or software modules for synthesizing, translating, or otherwise processing a design/simulation functional equivalent of the components, circuits, devices, or logic structures shown in FIG. 2 to generate a netlist 516 which may contain design structures such as design structure 504. Netlist 516 may comprise, for example, compiled or otherwise processed data structures representing a list of wires, discrete components, logic gates, control circuits, I/O devices, models, etc. that describes the connections to other elements and circuits in an integrated circuit design. Netlist 516 may be synthesized using an iterative process in which netlist 516 is resynthesized one or more times depending on design specifications and parameters for the device. As with other design structure types described herein, netlist 516 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 502 may include hardware and software modules for processing a variety of input data structure types including netlist 516. Such data structure types may reside, for example, within library elements 506 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 508, characterization data 510, verification data 512, design rules 514, and test data files 518 which may include input test patterns, output test results, and other testing information. Design process 502 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 502 without deviating from the scope and spirit of the invention. Design process 502 may also include modules for performing standard circuit design processes such as timing analysis, verification, design rule checking, place and route operations, etc.

Design process 502 employs and incorporates logic and physical design tools such as HDL compilers and simulation model build tools to process design structure 504 together with some or all of the depicted supporting data structures along with any additional mechanical design or data (if applicable), to generate a second design structure 520. Design structure 520 resides on a storage medium or programmable gate array in a data format used for the exchange of data of mechanical devices and structures (e.g. information stored in an ICES, DXF, Parasolid XT, JT, DRG, or any other suitable format for storing or rendering such mechanical design structures). Similar to design structure 504, design structure 520 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 2. In one embodiment, design structure 520 may comprise a compiled, executable HDL simulation model that functionally simulates the devices shown in FIG. 2

Design structure 520 may also employ a data format used for the exchange of layout data of integrated circuits and/or symbolic data format (e.g. information stored in a GDSII (GDS2), GL1, OASIS, map files, or any other suitable format for storing such design data structures). Design structure 520 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 2. Design structure 520 may then proceed to a stage 522 where, for example, design structure 520: proceeds to tape-out, is released to manufacturing, is released to a mask house, is sent to another design house, is sent back to the customer, etc.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor, comprising:

a plurality of general registers;

a first arithmetic logic unit (ALU) to perform fixed point instructions using at least two general registers to read data from a first and second general register of the plurality of general registers and write a result in at least a third general register of the plurality of general registers;

a second ALU to perform non-updating fixed point instructions using at least two general registers to only read data from the general registers; and an efficiency logic unit coupled to the first ALU and the second ALU, the efficiency logic unit to receive an instruction and determine whether the received instruction is an updating fixed point instruction or a non-updating fixed point instruction based on a number of general registers to be used to execute the received instruction and send the received instruction to the first ALU if the received instruction is the updating fixed point instruction or to the second ALU if the received instruction is the non-updating fixed point instruction, wherein the efficiency logic is to compare the received instruction to a predetermined list or table of instructions that indicates that the first ALU or the second ALU is to execute the received instruction; and wherein the first ALU is to perform updating fixed point instructions and the second ALU is to exclusively perform the non-updating fixed point instructions, wherein the non-updating fixed point instructions comprise at least one arithmetic operation.

2. The processor of claim 1, further comprising a plurality of read ports and at least one write port communicatively coupled to the first ALU.

3. The processor of claim 2, further comprising a plurality of read ports communicatively coupled to the second ALU.

4. The processor of claim 1, wherein the first ALU and the second ALU are to perform fixed point instructions in parallel.

5. The processor of claim 1, wherein the updating fixed point instructions to be performed by the first ALU comprise arithmetic calculations.

6. The processor of claim 1, wherein the non-updating fixed point instructions to be performed by the second ALU also comprise at least one branch address calculation.

7. The processor of claim 1, wherein the non-updating fixed point instructions to be performed by the second ALU also comprise at least one compare operation generating condition code.

* * * * *